No. 755,902. PATENTED MAR. 29, 1904.
W. B. MARTIN.
MEASURING DEVICE.
APPLICATION FILED AUG. 7, 1902.
NO MODEL. 2 SHEETS—SHEET 1.
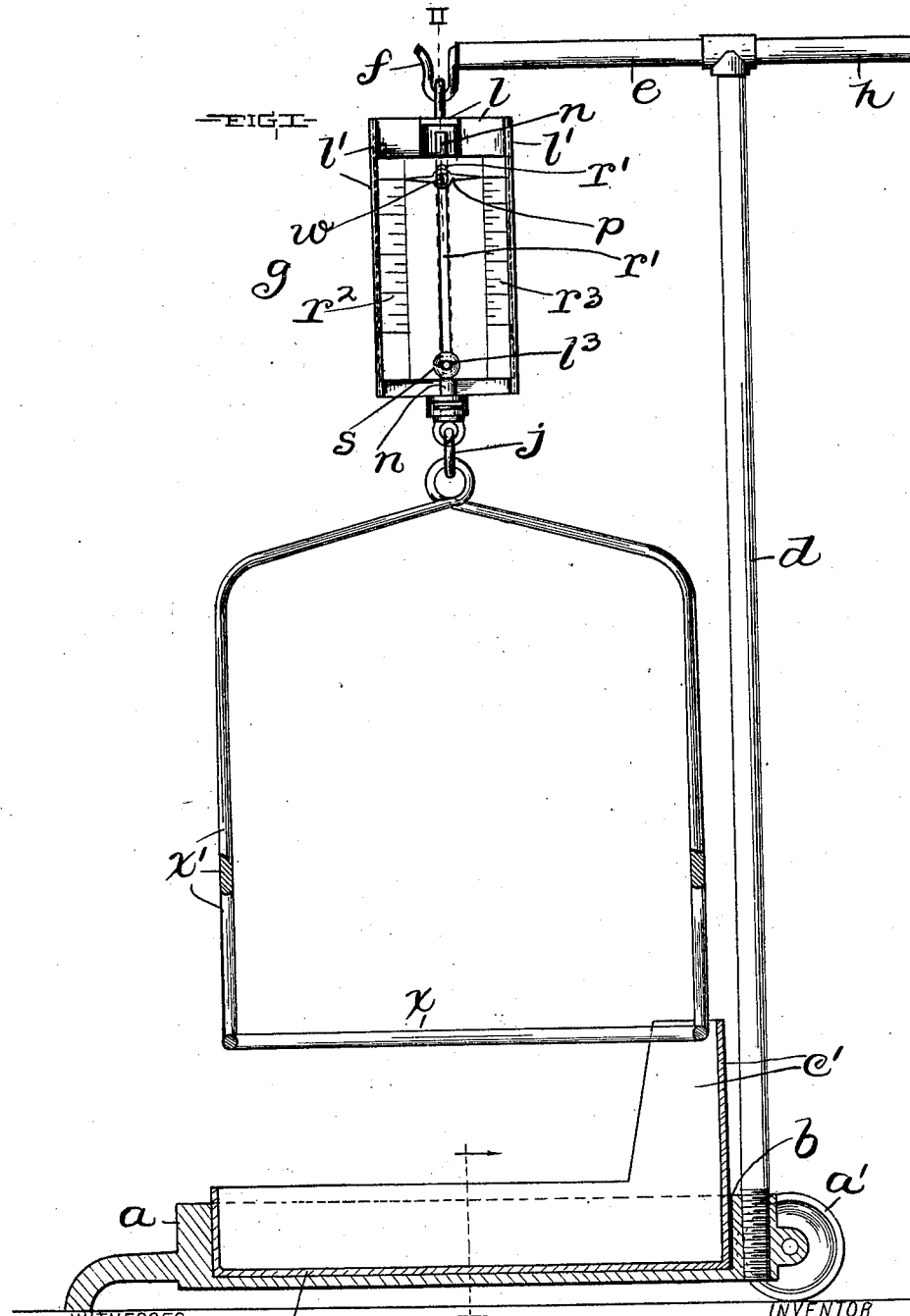

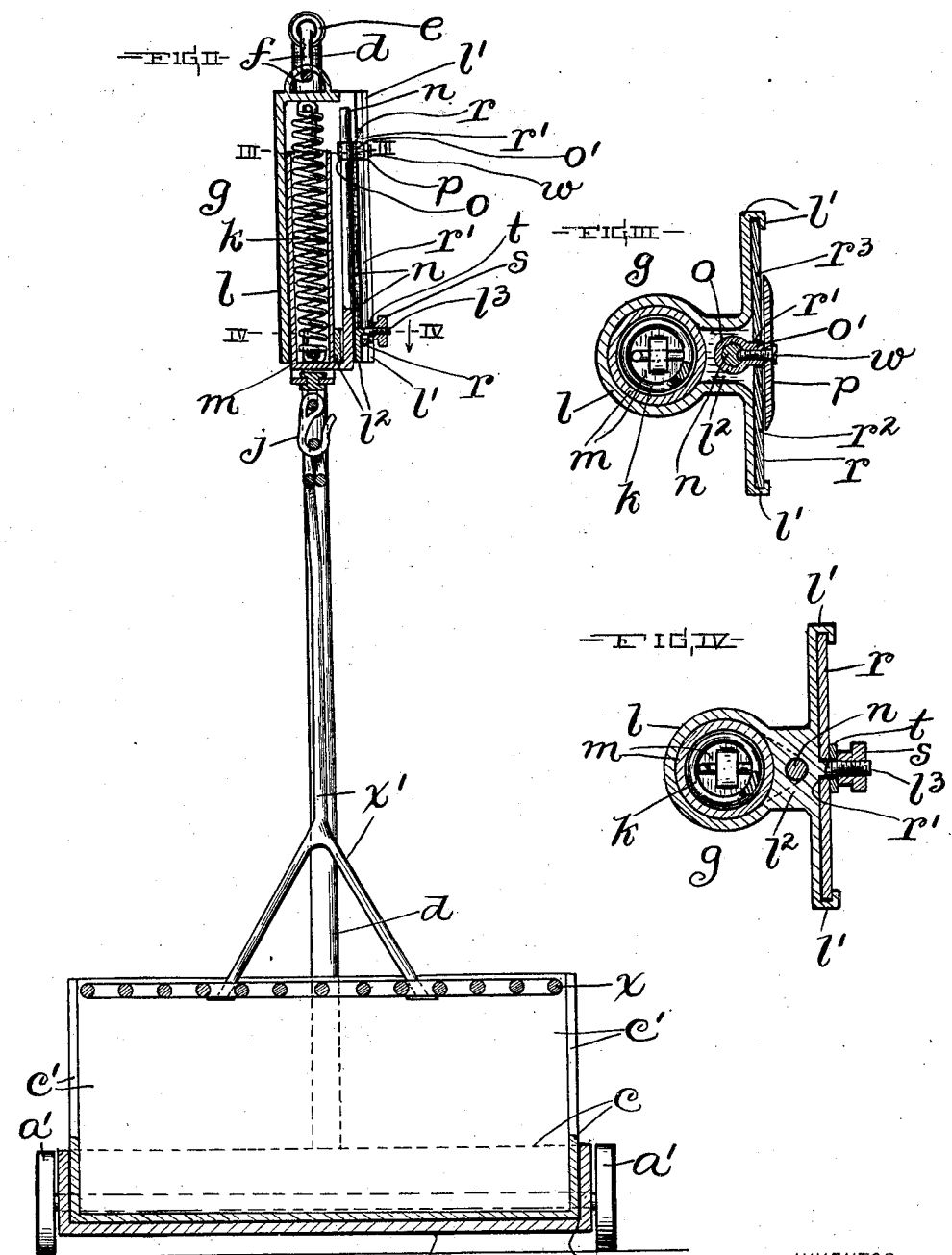

No. 755,902. Patented March 29, 1904.

UNITED STATES PATENT OFFICE.

WARD B. MARTIN, OF GENEVA, OHIO, ASSIGNOR, BY MESNE ASSIGN-MENTS, TO W. B. MARTIN.

MEASURING DEVICE.

SPECIFICATION forming part of Letters Patent No. 755,902, dated March 29, 1904.

Application filed August 7, 1902. Serial No. 118,793. (No model.)

*To all whom it may concern:*

Be it known that I, WARD B. MARTIN, a citizen of the United States of America, residing at Geneva, in the county of Ashtabula and State of Ohio, have invented certain new and useful Improvements in Measuring Devices; and I hereby declare the following to be a full, clear, and exact description of the invention, such as will enable others skilled in the art to which it pertains to make and use the same.

My invention relates to improvements in measuring devices more especially designed for measuring liquids.

The general object of this invention is to provide a measuring device of the character indicated which comprises a spring-balance having a face provided with a plurality of scales which extend longitudinally of the travel of an indicator adapted to coöperate with the said scales and differ in the spacing of the graduations thereof, so as to render the device suitable for use in measuring liquids of different specific gravities.

With this general object in view and to the end of providing a measuring device of the character indicated which is simple and durable in construction and convenient and cleanly my invention consists in certain features of construction and combinations of parts hereinafter described, and pointed out in the claims.

In the accompanying drawings, Figure I is a side elevation, partly in section, of a measuring device embodying my invention. Fig. II is an elevation largely in vertical section on line II II, Fig. I, looking in the direction indicated by the arrow. Fig. III is a top plan in horizontal section on line III III, Fig. II. Fig. IV is a top plan in horizontal section on line IV IV, Fig. II. Figs. III and IV are drawn on a larger scale than Figs. I and II.

Referring to the drawings, $a$ designates a wheeled truck which is conveniently moved from place to place as required and is provided with a shallow chamber $b$, upon the bottom of which is seated a drip-pan $c$. The chamber of the pan $c$ is open at the top. The truck is provided at one side with a standard $d$, which is arranged at one side of the pan $c$. The wheels $a'$ of the truck are arranged at the standard-bearing side of the truck. The standard $d$ is provided at its upper end with a laterally-projecting arm $e$, which extends over and is arranged a suitable distance above the drip-pan $c$. The arm $e$ is provided at its outer end with a hook $f$, from which a spring-balance $g$ is hung or suspended. The standard $d$ is also provided at its upper end with a handle $h$, which is arranged in line with the arm $e$.

The spring-balance comprises a coiled spring $k$, arranged vertically in the usual manner and fixed or rendered stationary at its upper extremity, being shown attached at its upper end to the upper end of an outer case $l$, which extends partially around an inner vertically-shiftable case $m$, into which the spring $k$ extends. The case $l$ and consequently the spring $k$ are hung or suspended from the hook $f$. The spring $k$ is attached at its lower end to the lower end of the case $m$, which surrounds the said spring. The case $m$ is arranged and extends upwardly a suitable distance within the relatively stationary case $l$, which forms a guide for the case $m$ during the vertical travel of the said case $m$.

The vertically-shiftable case or member $m$ is provided at one side and externally with a vertically-arranged stem $n$, which extends upwardly a suitable distance and is provided with an indicator $p$, which overlaps the outer and graduated side or face of a vertically-adjustable slide $r$. The stem $n$ is therefore connected to the lower end of the spring and descends with the downward distention of the spring.

The case $l$ has members $l'$, which extend along the slide $r$ and overlap the graduated face of the said slide at the side edges of the slide, so as to form a slideway for the said slide. It will be observed, therefore, that the slide $r$ engages a correspondingly vertically arranged slideway formed upon the case $l$.

The case $l$ is provided at its lower end with a vertically-bored guide-forming member $l^2$, which loosely embraces the stem $n$ and is provided at its upper end with a laterally-projecting stud $l^3$, which normally extends through the lower portion of a vertically-arranged slot $r'$, formed in and centrally between the side edges of the slide $r$. A nut $s$ is mounted upon the stud $l^3$ at the outer or graduated side of the slide $r$, and a washer $t$ embraces the said stud between the nut and the said side of the said slide. Obviously, therefore, the slide $r$ is rendered free to be readjusted or secured in the desired adjustment, according as the nut $s$ is loosened or tightened relative to the slide $r$.

The outer and graduated side or face of the slide $r$ has a plurality of vertically-arranged scales extending longitudinally of and parallel with the travel of the indicator $p$ and differing in the spacing of the graduations thereof. As shown in Fig. I, the said face of the slide $r$ is provided at one side of and a suitable distance from the slot $r'$ with a vertically-arranged scale or series of graduations $r^2$ and is provided at the other side of and a suitable distance from the said slot with a vertically-arranged scale or series of graduations $r^3$, and the graduations of the scale $r^3$ are spaced more closely than the graduations of the scale $r^2$, so that the scale $r^2$, having its graduations spaced farther apart than the graduations of the scale $r^3$, is suitable for use in measuring a liquid which has a greater specific gravity than the liquid for measuring which the scale $r^3$ is provided.

A sleeve $o$ is mounted upon and adjustable endwise of the stem $n$. The sleeve $o$ is provided externally with a lug $o'$, which extends through the slot $r'$. A set-screw $w$ extends into engagement with the stem $n$ through a correspondingly-screw-threaded hole formed in the said sleeve and its lug, as shown more clearly in Fig. III, and the indicator $p$ is mounted upon the shank of the said screw between the outer end of the said lug and the head of the screw, and obviously the indicator $p$ is secured to the sleeve $o$ by the same screw which secures the said sleeve in the desired adjustment. It is obvious, of course, that the indicator-bearing sleeve $o$ is rendered free to be readjusted endwise of the stem $n$, and consequently longitudinally of the scales $r^2$ and $r^3$, or is secured in the desired adjustment, according as the set-screw $w$ is loosened or tightened relative to the stem $n$.

It will be observed that the indicator comprises two points which coöperate with the different scales $r^2$ and $r^3$, respectively.

A hook $j$ is attached to and suspended from the lower end of the case $m$, and consequently from the lower end of the spring $k$, and a horizontally-arranged rack $x$ is suspended from the said hook.

The drip-pan $c$ adjacent to the standard $d$ has a portion or member $c'$, which extends upwardly between the standard $d$ and the said rack and surrounds the adjacent portion of the rack and prevents swinging of the said rack against the standard when the truck is tilted in moving it from place to place. The rack $x$ is arranged to discharge any liquid lodging thereon and dripping therefrom into the pan $c$. The rack $x$ is preferably suspended from the hook $j$ by a bail $x'$, with which the said rack is provided.

It will be observed that the construction hereinbefore described is simple and durable, that any oil or liquid dripping from a can or vessel placed upon the rack $x$ to be filled gravitates to and is caught by the pan $c$, and therefore does not drip upon the floor below, that as many different oils or liquids differing in specific gravity can be measured by my improved device as there are scales or series of graduations upon the slide $r$, and that the indicator $p$ normally points to the zero-graduation or beginning of the scales, and therefore is caused to descend by the weight of the can or vessel which is placed upon the rack $x$ to be filled, and I would here remark that the said can or vessel is filled while upon the said rack, and before it is supplied with liquid the indicator $p$ or the slide $r$, or both, are readjusted to bring the said indicator into line with the zero-graduation or beginning of the scales, so that the contents of the said can or vessel when filled is accurately measured.

It is obvious, of course, that the indicator bearing-stem $n$ extends above the normal position or elevation of the indicator $p$ far enough to accommodate the readjustment of the indicator upwardly upon the said stem when the stem descends with the indicator upon the distention of the spring of the spring-balance by the weight of the empty can or vessel which is placed upon the rack to be filled.

Referring again to the plurality of different scales appearing upon the graduated face of the spring-balance, suppose that the space between adjacent graduations of each scale represents one quart and that the more closely-graduated scale $r^3$ is correctly graduated for measuring gasolene and that the scale $r^2$ is correctly graduated for measuring a predetermined oil or liquid which is heavier than gasolene, then the scale $r^3$ and adjacent point of the indicator $p$ are watched in supplying a can or vessel with gasolene while upon the rack and the scale $r^2$ and coöperating point of the indicator are viewed in measuring the aforesaid heavier liquid, and the extent of the descent or actuation of the indicator while filling a can or vessel indicates the number of quarts or quantity of liquid run into the said vessel.

What I claim is—

1. A measuring device comprising a vertically-arranged coiled spring; a vertically-shiftable member attached to the lower end of the spring and provided with a vertically-arranged stem and having means for suspending the load to be measured; a relatively stationary member attached to the upper end of the spring and having a face-forming portion which is provided with a vertically-arranged slot and a correspondingly vertically arranged scale or series of graduations; a sleeve mounted upon and secured to the aforesaid stem and provided with a member which projects into and engages the aforesaid slot, and an indicator attached to the said slot-engaging sleeve member and arranged to coöperate with the aforesaid scale.

2. A measuring device comprising a vertically-arranged coiled spring; a vertically-shiftable member attached to the lower end of the spring and provided with a vertically-arranged stem and having means for suspending the load to be measured; a relatively stationary member attached to the upper end of the spring and having a face-forming portion which is provided, centrally between its side edges, with a vertically-arranged slot, and has two vertically-arranged scales at opposite sides respectively of the said slot, which scales differ in the spacing of the graduations thereof; a sleeve mounted upon and provided with a lug engaging the aforesaid slot, and an indicator attached to the said lug and having two pointers arranged to coöperate with the different scales, respectively.

3. A measuring device comprising a vertically-arranged coiled spring; a vertically-arranged member attached to and movable with the distention of the spring; means for suspending the load to be measured from the spring; a relatively stationary member attached to the upper end of the spring and provided with a face-forming portion which is provided with a vertically-arranged slot and has a vertically-arranged scale or series of graduations; a sleeve embracing and adjustable endwise of the aforesaid stem; means for securing the said sleeve in the desired adjustment, and an indicator borne by the sleeve and arranged to coöperate with the aforesaid scale.

4. A measuring device comprising a vertically-arranged coiled spring; a vertically-shiftable member attached to the lower end of the spring and provided, at one side, with an upwardly-extending vertically-arranged stem and having means for suspending the load to be measured; a relatively stationary member attached to the upper end of the spring and provided with a vertically-arranged slideway; a slide engaging the slideway and provided with a vertically-arranged slot and correspondingly vertically arranged scale or series of graduations upon its outer side or face; means for securing the slide in the desired adjustment, and a sleeve mounted upon and secured to the aforesaid stem and provided with a member which projects into and engages the aforesaid slot, and an indicator attached to the said slot-engaging sleeve member and arranged to coöperate with the aforesaid scale.

5. A measuring device comprising a vertically-arranged coiled spring; a vertically-shiftable member attached to the lower end of the spring and provided, at one side, with an upwardly-extending vertically-arranged stem, which vertically-shiftable member is provided with means for suspending the load to be measured; a relatively stationary member attached to the upper end of the spring and provided with a vertically-arranged slideway; a slide engaging the said slideway and provided, centrally between its side edges, with a vertically-arranged slot, and having two vertically-arranged scales upon its outer side or face at opposite sides, respectively, of the said slot, which scales differ in the spacing of the graduations thereof; means for securing the slide in the desired adjustment, and a sleeve mounted upon and secured to the aforesaid stem and provided with a lug engaging the aforesaid slot, and an indicator attached to the said lug and having two pointers arranged to coöperate with the different scales, respectively.

6. A measuring device comprising a vertically-arranged coiled spring; a vertically-arranged stem attached to, and movable with the distention of, the spring; means for suspending the load to be measured from the spring; a relatively stationary member attached to the upper end of the spring and provided with a vertically-arranged slideway; a correspondingly vertically arranged slide engaging the said slideway and provided with a vertically-arranged slot, and having a vertically-arranged scale or series of graduations upon its outer side or face; means for securing the slide in the desired adjustment; a sleeve embracing and adjustable endwise of the aforesaid stem; means for securing the said sleeve in the desired adjustment, and an indicator borne by the sleeve and arranged to coöperate with the aforesaid scale.

7. A measuring device comprising a truck having a standard and wheels at the standard-bearing side of the truck, which standard is provided, at its upper end, with a laterally-projecting arm; a drip-pan borne by the truck a suitable distance below the said arm; a spring-balance suspended from the said arm and arranged over and a suitable distance above the drip-pan, and means for suspending the load to be measured over the chamber of the drip-pan from the spring of the spring-balance, substantially as and for the purpose set forth.

8. A measuring device comprising a truck having a standard and wheels at the standard-bearing side of the truck, which standard is provided, at its upper end, with a laterally-projecting arm; a drip-pan borne by the truck a suitable distance below the said arm; a spring-balance suspended from the arm and arranged over and a suitable distance above the drip-pan, and a rack arranged to discharge liquid received thereon and dripping therefrom into the chamber of the drip-pan and provided with a bail suspended from the spring of the spring-balance, and the drip-pan having a portion or member which extends upwardly between the rack and the standard and extends around the adjacent portion of the rack, substantially as and for the purpose set forth.

In testimony whereof I sign the foregoing specification, in the presence of two witnesses, this 19th day of July, 1902, at Cleveland, Ohio.

WARD B. MARTIN.

Witnesses:
C. H. DORER,
TELSA SCHWARTZ.